United States Patent
Auger et al.

(10) Patent No.: US 9,879,098 B2
(45) Date of Patent: Jan. 30, 2018

(54) MITIGATION OF WAX LEVELS IN THE HIGH PRESSURE LOW DENSITY POLYETHYLENE PROCESS

(71) Applicant: NOVA Chemicals (International) S.A., Fribourg (CH)

(72) Inventors: James A. Auger, Airdrie (CA); Craig Allan Hulet, Calgary (CA); Ross Donald Moreton, Sarnia (CA); Benjamin Milton Shaw, Calgary (CA); Amanda Dolores Murphy, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 15/319,401

(22) PCT Filed: May 19, 2015

(86) PCT No.: PCT/IB2015/053693
§ 371 (c)(1),
(2) Date: Dec. 16, 2016

(87) PCT Pub. No.: WO2015/193753
PCT Pub. Date: Dec. 23, 2015

(65) Prior Publication Data
US 2017/0152329 A1    Jun. 1, 2017

(30) Foreign Application Priority Data

Jun. 19, 2014    (CA) ..................................... 2854847

(51) Int. Cl.
*C08F 10/02*    (2006.01)
*C08F 2/38*    (2006.01)

(52) U.S. Cl.
CPC .................................... *C08F 10/02* (2013.01)

(58) Field of Classification Search
CPC ..................................................... C08F 10/02
USPC .......................................................... 526/68
See application file for complete search history.

(56) References Cited

U.S. PATENT DOCUMENTS

| 3,334,081 | A | 8/1967 | Madgwick et al. |
| 3,399,185 | A | 8/1968 | Schappert |
| 3,916,577 | A | 11/1975 | Vare |
| 4,135,044 | A | 1/1979 | Beals |
| 8,048,971 | B2 * | 11/2011 | Goossens ............. B01J 19/2415 422/131 |

FOREIGN PATENT DOCUMENTS

WO    2013/132009 A1    9/2013

OTHER PUBLICATIONS

Othmer, Kirk; Polyethylene, Low Density; Kirk-Othmer Encyclopedia of Chemical Technology; copyright John Wiley & Sons, Inc. (2001); vol. 00; pp. 1-40.

* cited by examiner

*Primary Examiner* — Fred M Teskin
(74) *Attorney, Agent, or Firm* — Julie L. Heinrich

(57) ABSTRACT

In the high pressure polymerization of ethylene homopolymers or copolymers, conditions in the high pressure recycle system may lead to the build-up of low molecular weight oligomers and waxes. Sequentially draining knock-out pots, located downstream of a high pressure separator, at regular intervals can reduce the build-up of low molecular weight oligomers and waxes during the high pressure polymerization of alpha olefins.

18 Claims, 2 Drawing Sheets

MITIGATION OF WAX LEVELS IN THE HIGH PRESSURE LOW DENSITY POLYETHYLENE PROCESS

TECHNICAL FIELD

The present invention relates to the high pressure polymerization of ethylene homopolymers and copolymers. During the high pressure polymerization of ethylene homopolymers and copolymers the build-up of low molecular weight oligomers and waxes can occur at various points between the outlet of the high pressure separator and the inlet to the hypercompressor. A review of the literature reveals a relationship between branching of low molecular weight hydrocarbons and solubility in ethylene. Low molecular weight oligomer and wax build-up results in reactor downtime, lost production, and increased wear on reactor components. As far as Applicants are aware there is no art describing a process to prevent the build-up of low molecular weight oligomers and waxes in a high pressure reactor.

BACKGROUND ART

WIPO patent WO2013132009 (A1) published Sep. 12, 2013 in the name of Borealis AG discloses a process and plant for manufacturing polyethylene or ethylene based copolymers. The patent discloses a known set-up for a high pressure polyethylene reactor consisting of two compressors, a polymerization reactor, and two separators (for separating the monomer-polymer mixture leaving the reactor) having recycle feeds that contain dewaxing units. The patent does not teach how the de-waxing units are operated to reduce low molecular weight oligomers and wax build-up at various points in the reactor.

The online Kirk-Othmer Encyclopedia of Chemical Technology Vol. 00 Polyethylene, Low Density at page 38 discloses that the recycle system used in the high pressure polymerization of polyethylene generally comprises two sections: a high-pressure separator and a low-pressure separator. Kirk-Othmer discloses that the high-pressure separator first divides the polymer from the ethylene gases and low molecular weight waxes and that the gases and waxes are then separated and cooled. However, Kirk-Othmer does not suggest a process for reducing low molecular weight oligomers and wax build-up at various points in the reactor.

The present invention seeks to provide a method for reducing low molecular weight oligomers and wax build-up at various points between the high pressure separator and the hypercompressor by separately draining each of n knock-out pots downstream of the high-pressure separator at a frequency of once every 24/n hours, or at least once every 8 hours, preferably at least once every 6 hours. It also seeks to provide a process for increasing the capacity of a high pressure reactor having a fixed reactor volume by increasing the operating pressure of the reactor and draining each of n knock-out pots, where n is greater than 1, preferably greater than 2, downstream of the high-pressure separator at a frequency of once every 24/n hours, or at least once every 8 hours, preferably at least once every 6 hours.

DISCLOSURE OF INVENTION

The present invention provides, in a high pressure polymerization of one or more $C_{2-8}$ alpha olefins, which may be optionally functionalized at an olefin recycle of not less than 50% of the initial olefin feed, preferably not less than 55% of the initial olefin feed, a process for the reduction of low molecular weight oligomers and wax build-up including n knock-out pots, downstream from the overhead stream from a high pressure separator, at least said initial knock-out pot has a mechanical means to separate out liquid polyethylene selected from the group consisting of a tangential knock out pot, a series of horizontal baffle plates, and a vertical IMPact plate, and a dump valve at the bottom of the knock-out pot for removal of separated liquid polyethylene, and an exit valve for the overhead stream in the upper portion of the knock-out pot, and the remaining knock-out pots are conventional knock-out pots, where n is a whole number between 2 and 8 comprising: separately draining each of said knock-out pots at a frequency of at least once every 24/n hours, or at least once every 8 hours, preferably at least once every 5-6 hours; preferably draining said knock-out pots sequentially.

In a further embodiment, the knock-out pots are operated over sequentially decreasing temperatures ranging from at most 280° C. to at least 65° C., and over sequentially decreasing pressures ranging from at most 30 MPa to at least 15 MPa.

In a further embodiment, there is one tangential knock-out pot immediately downstream from the overhead stream of the high pressure separator and there are n–1 conventional knock-out pots comprising an upper inlet, an upper exit, and a bottom dump valve operating over sequentially decreasing temperatures ranging from at most 215° C. to at least 65° C. and over sequentially decreasing pressures from at most 30 MPa to at least 15 MPa.

In a further embodiment, the tangential knock-out pot is operated at temperatures from 270° C. to 215° C. and pressures from 30 MPa to 15 MPa.

In a further embodiment, there is a cooler for the overhead stream between each conventional knock-out pot.

In a further embodiment, there are one or more coolers downstream of the last conventional knock-out pot, which reduce the temperature of the overhead stream from 65° C. to 20° C.

In a further embodiment, the draining of said knock-out pots occurs by opening a dump valve.

In a further embodiment, monomers are selected from a group comprising ethylene, propylene, 1-butene, iso-butene, 1-hexene, 1-octene, methacrylic acid, methyl acrylate, methyl methlacrylate, ethyl methlacrylate, vinyl acetate, acrylic acid, ethyl acrylate and n-butyl acrylate and consist of not less than 80 wt. % ethylene and not more than 20 wt. %, preferably not more than 10 wt. %, typically less than 2 wt. % comonomer.

In a further embodiment, the $C_{2-8}$ alpha olefins are selected from the group consisting of ethylene, propylene, and 1-butene.

In a further embodiment, the low molecular weight oligomers and wax undergo rearrangements at the conditions in the knock-out pots so as to become capable of being entrained in the vapour stream leaving said knock-out pot.

The present invention also seeks to provide a process for increasing the capacity of a high pressure reactor having a fixed reactor volume by increasing the operating pressure of the high pressure compressor, the improvement comprising operating n knock-out pots, downstream from and for the overhead stream from a high pressure separator, at least said initial knock-out pot having a mechanical means to separate out liquid polyethylene and a dump valve at the bottom of the knock-out pot for removal of separated liquid polyethylene, and an exit valve for the overhead stream in the upper portion of the knock-out pot, and the remaining knock-out pots are conventional knock-out pots, where n is a whole number between 2 and 8, comprising: separately draining each of said knock-out pots at a frequency of once every 24/n hours, or at least once every 8 hours, preferably at least once every 5-6 hours; preferably draining said knock-out pots sequentially.

BEST MODE FOR CARRYING OUT THE INVENTION

Figure 1:
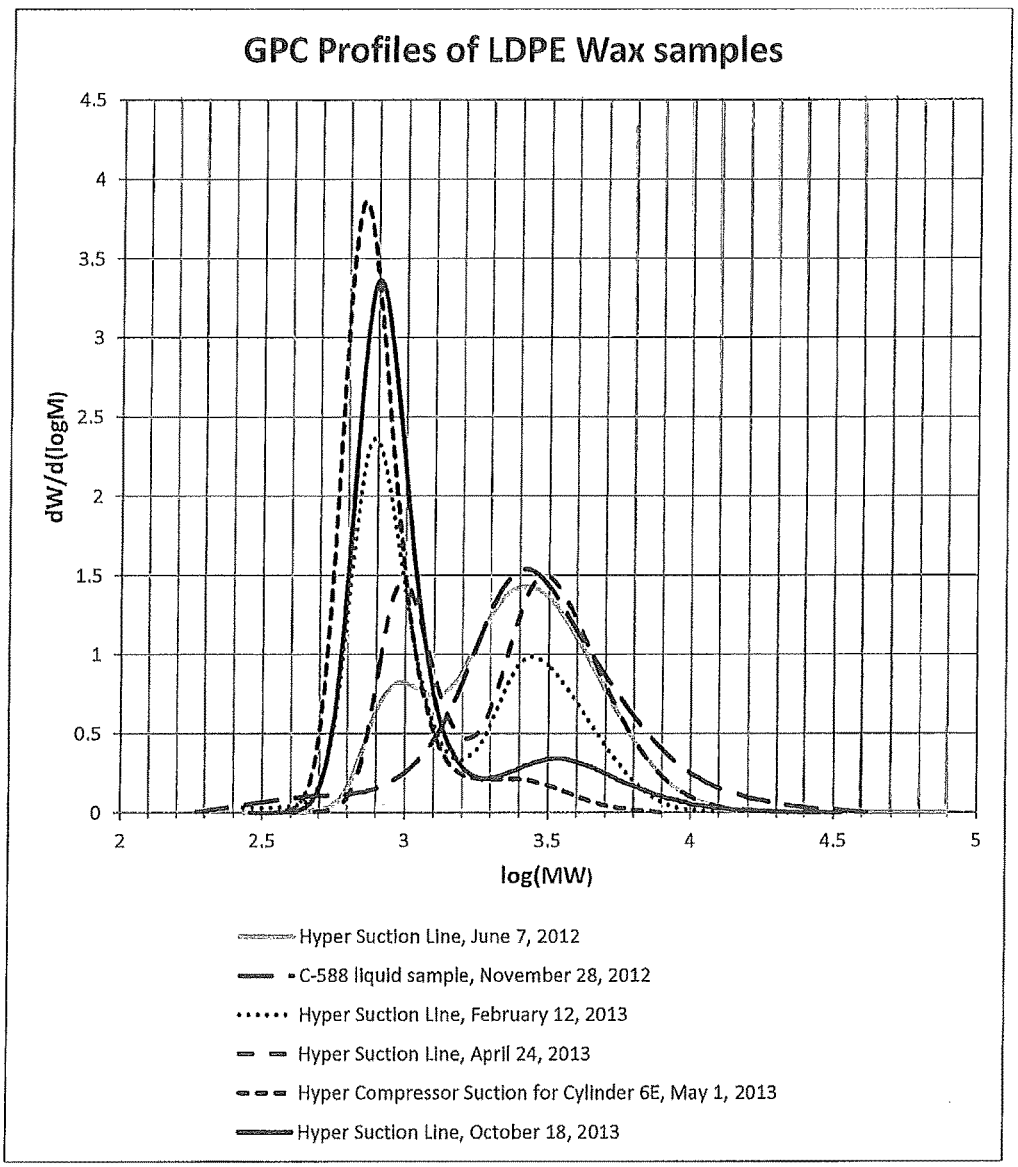
FIG. 1 illustrates the molecular weight of the waxy material found in the tangential knock-out pot and the hyper-suction areas further downstream of the tangential knock-out pot.

Polyethylene was originally produced industrially using a high pressure process. Although the process has been modified over time it essentially comprises compressing ethylene to a high enough pressure so that it becomes a supercritical fluid. Typically the pressures range from about 80 to 310 MPa (e.g. about 11,500 psi to about 45,000 psi) preferably from about 190 to 300 MPa (about 30,000 psi to about 43,500 psi) and the temperature ranges from 130° C. to 350° C., typically from 150° C. to 340° C. The supercritical ethylene together with one or more of initiators, chain transfer agents and optional comonomers are fed to a high pressure reactor. The reactor may be a tubular reactor. Tubular reactors may have a length from about 200 m to as long as 3000 m, and a diameter from about 20 mm to about 100 mm.

Generally there are a number of injection points spaced along the tubular reactor where additional components such as initiators, chain transfer agents, and monomers (preferably cold monomers), may be added to the reactor. The design and operation of tubular reactors is illustrated by a number of patents including, for example, U.S. Pat. No. 3,334,081 issued Aug. 1, 1967 to Madgwick et al, assigned to Union Carbide Corporation; U.S. Pat. No. 3,399,185 issued Aug. 27, 1968 to Schappert, assigned to Koppers CoMPany, Inc., U.S. Pat. No. 3,917,577 issued Nov. 4, 1975 to Trieschmann et al., assigned to Badische Anilin & Soda-Fabrik Aktiengesellschaft; and U.S. Pat. No. 4,135,044 issued Jan. 16, 1979 to Beals, assigned to Exxon Research & Engineering Co.

The feed may be entirely ethylene or may be a mixture of ethylene and one or more comonomers. Typically the comonomers, if present, are present in amounts of less than about 20 weight %, preferably less than 10 weight %, typically for copolymers without a functional group less than 5 weight % based on the total weight of the feed.

Some comonomers that may be copolymerized with ethylene under high pressure conditions include:
olefins such as propylene, 1-butene, 1-hexene, 4-methyl-1-pentene, and 1-octene;
$C_{3-6}$ ethylenically unsaturated carboxylic acids including acrylic acid, methacrylic acid, crotonic acid, maleic acid, and itaconic acid;
$C_{1-6}$, preferably $C_{1-4}$ alkyl esters of $C_{3-6}$ ethylenically unsaturated carboxylic acids including: acrylic-type esters such as methyl acrylate, ethyl acrylate, n-butyl acrylate, t-butyl acrylate, 2-ethylhexyl acrylate, methyl methacrylate, n-butyl methacrylate, t-butyl methacrylate;
amides of $C_{3-6}$ ethylenically unsaturated carboxylic acids such as dimethylacrylamide, N-isopropylacrylamide, N-t-butylacrylamide, N-phenylacrylamide, diacetone acrylamide, methacrylamide, N-phenylmethacrylamide, N-ethylmaleimide, and
vinyl esters such as vinyl acetate, vinyl butyrate, vinyl pivalate.

Additional potential comonomers may include: haloolefins such as vinyl fluoride, vinylidene fluoride, tetrafluoroethylene, vinyl chloride, vinylidene chloride, tetrachloroethylene, and chlorotrifluoroethylene; and other compounds such as allyl alcohol.

A known set-up for the high pressure polymerization of ethylene consists of a set of two compressors (a primary compressor and a high-pressure compressor (e.g. a hyper-compressor)), a preheater and polymerization reactor, and two or more separators for separating the unreacted monomer and comonomers from the reacted polymer. In the present invention, the $C_{2-8}$ alpha olefins (which may be optionally functionalized), comonomer, initiator, and chain transfer agent are pressurized to the required pressure and are fed to the reactor, typically at several injection points. Downstream of the reactor, the output stream enters a high-pressure separator where unreacted $C_{2-8}$ alpha olefins and other comonomers are separated from the polyethylene before entering a series of knock-out pots. At least the initial knock-out pot includes a means to physically separate any liquid polyethylene entrained within the gaseous flow of monomer and comonomer, a dump valve at the bottom of the knock-out pot, and an outlet for the overhead stream in the upper portion of the knock-out pot. The initial knock-out pot is preferably operated at temperatures from 270° C. to 215° C. and pressures from 30 MPa to 15 MPa. The remaining knock-out pots may be conventional knock-out pots having an upper inlet valve, an upper exit valve, and a bottom dump valve operating over sequentially decreasing temperatures, preferably ranging from at most 215° C. to at least 65° C. and pressures from 30 MPa to 15 MPa. In between each conventional knock-out pot, there is a cooler for the overhead stream. Downstream of the last conventional knock-out pot, there are one or more coolers which reduce the temperature of the overhead stream to from 65 to 20° C.

Figure 2:
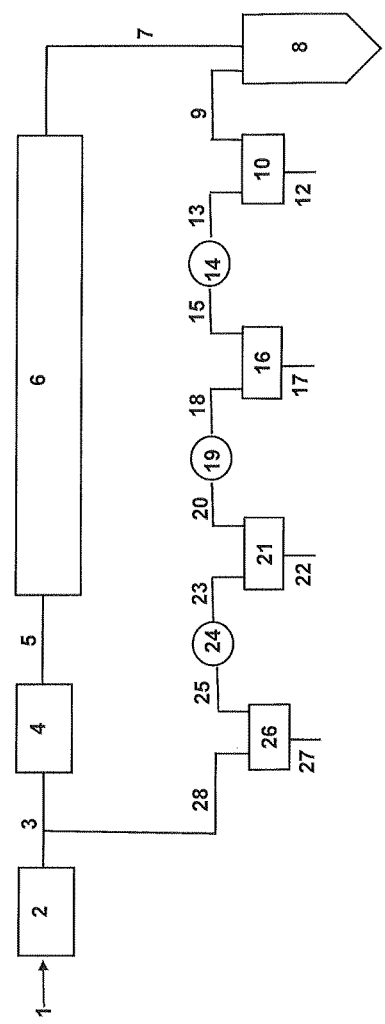
FIG. 2 shows a schematic layout of part of a tubular reactor in accordance with the present invention.

The operation of a tubular reactor employing the knock-out pots as described above will be described in association with FIG. 2. FIG. 2 is a schematic diagram of the parts of a tubular reactor using knock-out pots (drums) in accordance with the present invention. A feed 1 of ethylene at a pressure of about 2 to 7 MPa enters the preliminary lower pressure compressor 2, to compress the feed to pressures from about 17.5 MPa to about 18.5 MPa (about 2538 psi to 2683 psi). The output from the low pressure compressor passes by line 3 to the inlet (suction) of a hyper compressor 4 that compresses the ethylene to a pressure from about 80 MPa to about 310 MPa (e.g. about 11,500 psi to about 45,000 psi). The hypercompressor is typically a reciprocating two stage compressor having an even number of cylinders, typically at least 14, and possibly more if a second compressor frame has been added. At these pressures the ethylene is a super critical fluid. The feed passes through line 5 to reactor 6. The reactor may be a series of autoclaves or a serpentine reactor having a length from about 200 m to as long as 3000 m, and a diameter from about 20 mm to about 100 mm. The temperature of the reactor may be from about 130° C. to 350° C., typically from about 150° C. to about 340° C. There may be multiple additional (e.g. 3 or 4) feed streams of cooled monomer and optionally initiator at different points in a serpentine reactor. On exiting reactor 6, the supercritical fluid passes through line 7 to a high pressure separator 8. In the high pressure separator the pressure is reduced from about 27 MPa to about 23 MPa and the temperature ranges from at least 245° C. to at most 280° C. The amorphous polyethylene and a small amount of entrained monomer exits the bottom of the high pressure separator and goes to a low pressure separator (not shown). The overhead stream from the high pressure separator 8 passes by line 9 to the first knock-out pot 10.

The first pot contains a physical separation means to separate any entrained liquid polyethylene or waxes from the gaseous overhead stream. For example, the physical separation means could comprise a series of horizontal baffle plates separated by from 1 to 5 cm, include an inlet designed to direct the inlet stream in a tangential manner around the inside wall of the pot (i.e. it is a tangential knock-out pot) used in conjunction with a horizontal separator plate wherein there is an annular gap between said plate and the wall of the knock-out pot, or include a vertical impact plate proximate to the inlet allowing the inlet gases to impinge upon the plate where wax and polyethylene can condense and eventually drop to the bottom of the pot where they can be expelled by a dump valve.

To clarify, the initial knock-out pot helps separate the condensate (polyethylene, waxes and oligomers) from the gas stream. The condensate drains down the wall to the bottom of the pot. The first knock-out pot is operated at temperatures ranging from 270° C. to 215° C. and pressures from 30 MPa to 15 MPa. The low molecular weight waxes and oligomers of ethylene are drained from the bottom of knock-out pot 10 through line 12.

The overhead stream from the tangential knock-out pot 10 passes by line 13 to a cooler/chiller 14 and then by line 15 to a second knock-out pot 16, which in the figure is a conventional knock-out pot (e.g. doesn't have a tangential feed). The condensate pools at the bottom of the knock-out pot and is drained from the bottom of the pot through line 17.

The overhead stream from the knock-out pot 16 passes by line 18 to a cooler/chiller 19 and then line 20 to a third knock-out pot 21, which in the figure is a conventional knock-out pot (e.g. doesn't have a tangential feed). The condensate pools at the bottom of the knock-out pot and is drained from the bottom of the pot through line 22.

The overhead stream from the third knock-out pot 21 passes by line 23 to a cooler/chiller 24 and then line 25 to a fourth knock-out pot 26, which in the figure is a conventional knock-out pot (e.g. doesn't have a tangential feed). The condensate pools at the bottom of the knock-out pot and is drained from the bottom of the pot through line 27. The overhead from the fourth knock-out pot passes by line 28 to the suction for the hyper compressor 4. There may be one or more coolers/chillers in line 28, which are not shown in the figure.

The second, third, and fourth knock-out pots in the figure are operated sequentially. The knock-out pots are operated over sequentially decreasing temperatures, preferably ranging from at 220° C. to 80° C. and over sequentially decreasing pressures ranging from 30 MPa to 15 MPa.

Although the figure shows the knock-out pots downstream from the "tangential knock-out pot" in sequential operation, an alternative configuration allows for one or more of the conventional knock-out pots located downstream from the tangential knock-out pot and their associated cooler/chiller to be operated in parallel with the other conventional knock-out pots.

In prior practice, upon entering the high pressure separators, the polyethylene, low molecular weight oligomers, and/or waxes drained to the bottom of the knock-out pots where it remained until it was manually drained by an operator. The unreacted $C_{2-8}$ alpha olefins remained in the overhead stream and were eventually recycled back into the polymerization process upstream of the polymerization reactor. However, when the compressed ethylene flow rate of the reactor was increased above 50 t/hour, preferably above 75 t/hour, without an increase in the reactor volume, an increase in wax build-up at various points in the high pressure recycle system was observed. It is suspected that at the conditions present in the high-pressure separators, low molecular weight oligomers and waxes are generated by the scissioning of polyethylene. These scissioned molecules become re-entrained in the overhead stream and continue downstream where they are eventually recycled back into the polymerization process and deposited where the recycle process is cooled or there is a pressure drop.

In order to implement the present invention, the dump valves at the bottom of the tangential and conventional knock-out pots are separately drained by opening each of the dump valves at a frequency of once every 24/n hours, or at least once every 8 hours, preferably at least once every 5-6 hours, and preferably draining said knock-out pots sequentially, where n is the number of knock-out pots.

Experiment

The molecular weight of samples of the waxy product obtained from the tangential knock-out pot and the suction for the hyper compressor before and after operation of the "dump valves" in accordance with the present invention. As seen in this figure, following the operation of the dump valves at a frequency of once every 24/n hours for a two month period, the build-up of waxy material with a molecular weight of approximately $10^{3.5}$ had been reduced.

Without being bound by theory it is believed the low molecular weight material in the knock-out pots was undergoing some type of chain scission and after about 6-10 hours generated material which was capable of being entrained in the overhead streams from the knock-out pots, resulting in downstream buildup of the waxy product described above.

INDUSTRIAL APPLICABILITY

The present invention seeks to provide a method to reduce the build-up of low molecular weight oligomers and waxes in a high pressure polyethylene process by providing a series of two or more knock out pots downstream from the overhead line from the high pressure separator, which knock out pots are operated over a decreasing temperature range from 280° C. to 65° C. and a decreasing pressure range from 30 MPa to 15 MPa, said pots being drained at least once every 24 hours.

The invention claimed is:

1. In a high pressure polymerization of one or more $C_{2-8}$ alpha olefins, which may be optionally functionalized at an olefin recycle of not less than 50% of the initial olefin feed, a process for the reduction of low molecular weight oligomers and wax build-up formed from rearrangement of liquid polyethylene carried over from a high pressure separator, including n knock-out pots, where n is greater than 1, downstream from the overhead stream from said high pressure separator, at least said initial knock-out pot has a mechanical means to separate the liquid polyethylene and a dump valve at the bottom of the knock-out pot for removal of separated liquid polyethylene, and an exit valve for the overhead stream in the upper portion of the knock-out pot, and the remaining knock-out pots are conventional knock-out pots, where n is a whole number between 2 and 8 comprising: separately draining each of said knock-out pots at a frequency of at least once every 24/n hours provided that when n=2 the frequency is at least once every 8 hours.

2. The process according to claim 1 wherein the mechanical means to separate liquid polyethylene in the initial knock-out pot is selected from the group consisting of:
an inlet designed to direct the inlet stream in a tangential manner around the inside wall of the pot used in conjunction with a horizontal separator plate wherein there is an annular gap between said plate and the wall of the knock-out pot; a series of horizontal baffle plates separated by from 1 to 5 cm; a vertical IMPact plate proximate to the inlet where wax and polyethylene condense and eventually drop to the drop out portion of the pot.

3. The process according to claim 2 wherein the knock-out pots are operated at sequentially decreasing temperatures ranging from at most 280° C. to at least 65° C., and over sequentially decreasing pressures ranging from at most 30 MPa to at least 15 MPa.

4. A process according to claim 3 wherein there is one knock-out pot with the means to physically separate liquid polyethylene immediately downstream from the overhead stream of the high pressure separator and there are n−1 conventional knock-out pots comprising an upper inlet, an upper exit, and a bottom dump valve operating over sequentially decreasing temperatures ranging from at most 215° C. to at least 65° C. and over sequentially decreasing pressures from at most 30 MPa to a least 15 MPa.

5. A process according to claim 4 where the knock-out pot with the means to physically separate liquid polyethylene is located directly downstream of said overhead stream from high pressure separator and said knock-out pot is operated at temperatures from 270° C. to 215° C. and pressures from 30 MPa to 15 MPa.

6. A process according to claim 5 wherein there is a cooler for the overhead stream between each conventional knock-out pot.

7. A process according to claim 6 further comprising one or more coolers downstream of the last conventional knock-out pot, which reduce the temperature of the overhead stream to from 45° C. to 20° C.

8. The process according to claim 7, wherein draining of said knock-out pots occurs by opening a dump valve.

9. The process according to claim 8, wherein draining of said knock-out pots occurs at least once every 6 hours.

10. The process according to claim 9, wherein the initial knock-out pot is a tangential knock-out pot.

11. The process according to claim 10 wherein the conventional knock-out pots are operated over a temperature range from 240-80° C. and a pressure range from 28-17 MPa.

12. The process according to claim 11 wherein the high pressure polymerization is optionally functionalized at an ethylene feed rate of not less 50 t/hr.

13. The process according to claim 12 where the reactor system comprises a serpentine reactor.

14. The process according to claim 12 where the reactor system comprises one or more autoclaves.

15. The process according to claim 12 wherein the monomers are selected from ethylene, propylene, 1-butene, isobutene, 1-hexene, 1-octene, methacrylic acid, methyl acrylate, methyl methacrylate, ethyl methacrylate, vinyl acetate, acrylic acid, ethyl acrylate and n-butyl acrylate and consist of not less than 80% ethylene.

16. The process according to claim 15 where the $C_{2-8}$ alpha olefins are selected from ethylene, propylene, or 1-butene.

17. The process according to claim 1, wherein the low molecular weight oligomers and wax undergo rearrangements at the conditions in the knock-out pots so as to become capable of being entrained in the vapour stream leaving said knock-out pots.

18. In a high pressure polymerization of one or more $C_{2-8}$ alpha olefins a process for increasing the throughput of a high pressure reactor having a fixed reactor volume by increasing the pumping capacity of a high pressure compressor, the improvement comprising operating n knock-out pots downstream from the overhead stream from a high pressure separator, at least said initial knock-out pot has a mechanical means to separate out the liquid polyethylene and a dump valve at the bottom of the knock-out pot for removal of separated liquid polyethylene, and an exit valve for the overhead stream in the upper portion of the knock-out pot, and the remaining knock-out pots are conventional knock-out pots, where n is a whole number between 2 and 8 comprising: separately draining each of said knock-out pots at a frequency of at least once every 24/n hours provided that when n=2 the frequency is at least once every 8 hours.

* * * * *